United States Patent [19]

Delor et al.

[11] Patent Number: 4,555,382

[45] Date of Patent: Nov. 26, 1985

[54] METHOD OF PROTECTION OF A PRESSURIZED-WATER NUCLEAR REACTOR

[75] Inventors: Michel Delor, Rueil Malmaison; Michel Bruyere, Vaux Sur Seine, both of France

[73] Assignee: Framatome & Cie, Courbevoie, France

[21] Appl. No.: 386,476

[22] Filed: Jun. 8, 1982

Related U.S. Application Data

[63] Continuation-in-part of Ser. No. 103,556, Dec. 13, 1979, abandoned.

[30] Foreign Application Priority Data

Dec. 20, 1978 [FR] France .................................. 78 35765

[51] Int. Cl.⁴ .............................................. G21C 7/36
[52] U.S. Cl. ...................................... 376/216; 376/245; 376/254; 376/258
[58] Field of Search ............... 376/216, 217, 245, 254, 376/258, 259

[56] References Cited

U.S. PATENT DOCUMENTS 3,998,693  12/1976  Musick ................................ 376/217
4,318,778  3/1982   Musick ................................ 376/216

Primary Examiner—Donald P. Walsh
Attorney, Agent, or Firm—Pollock, Vande Sande & Priddy

[57] ABSTRACT

The invention relates to a method of protection of a pressurized-water nuclear reactor, which enables the crisis of boiling and the melting of fuel to be avoided. An emergency shutdown is triggered when a parameter representative of the crisis of boiling or the power released per unit length of the fuel elements exceeds a limiting value. For the determination of these parameters, the most exact representation possible of the distribution of the power in the core of the reactor is employed. This distribution is obtained by measurement of the axial power by ionization chambers, and determination of the radial power by measurement of the positions of the control rods.

3 Claims, 9 Drawing Figures

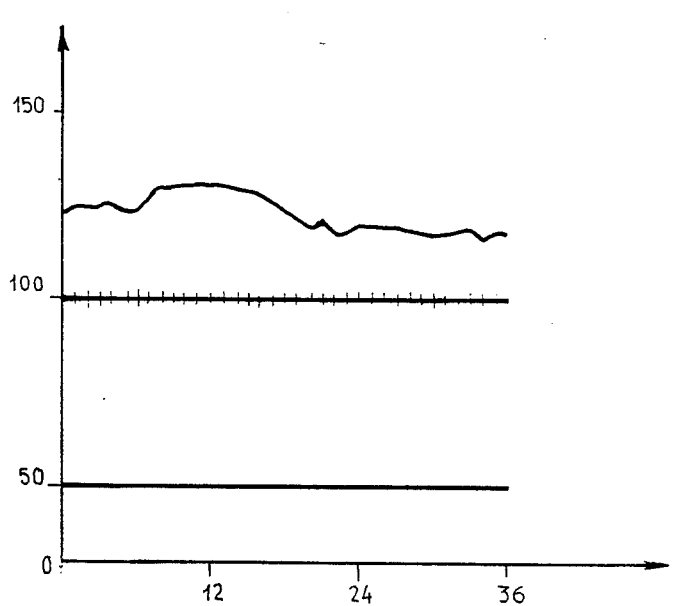

METHOD OF PROTECTION OF A PRESSURIZED-WATER NUCLEAR REACTOR

REFERENCE TO PRIOR ART RELATED APPLICATION

This is a continuation-in-part of U.S. patent application Ser. No. 103,556, filed Dec. 13, 1979 now abandoned.

FIELD OF THE INVENTION

The invention refers to a method of protection of a pressurized-water nuclear reactor, which enables avoidance of exceeding the limits of operation beyond which the integrity of the fuel is interfered with, by the appearance of the crisis of boiling and/or by the melting of one or more fuel pellets.

BACKGROUND

In a pressurized-water reactor the fuel elements are arranged in parallel with one another inside the core of the reactor, and for the control of the reactor control rods of material which absorbs the neutrons are moved between these fuel elements. The fuel elements are immersed in the primary fluid which is water under pressure, and which serves both as coolant fluid and moderator. The fuel elements delimit the coolant channels between them.

During operation of the reactor it is necessary to avoid damaging the fuel elements which can undergo an irreversible degradation under the effect of the heat which they release, if this amount of heat is too large to be absorbed and carried away by the coolant, or if the flow of the coolant is insufficient.

In the control of a pressurized-water nuclear reactor, it is necessary to provide against two different phenomena which are accompanied by a more or less complete destruction of the fuel. These two phenomena are, on the one hand, the crisis of boiling of the water under pressure in contact with the fuel elements, and on the other hand, the melting of the fuel.

In short, at the time of exchange of heat between the fuel and the water under pressure across the outer surface of the fuel rods the water, although maintained under high pressure, reaches under the effect of the high temperature of the fuel elements, a state close to boiling. A limited boiling phenomenon in the vicinity of the fuel elements may even favor the thermal exchanges between the fuel elements and the water under pressure. It is necessary, however, to prevent this boiling from leading to the formation of a film of steam along the fuel elements, because such a film of steam prevents large exchanges between the fuel element and the water under pressure, because of calefaction.

Hence it is extremely important to watch for the appearance of the starting of boiling with the production of steam in contact with the fuel elements, or the crisis of boiling, in order to avoid, during operation of the reactor, entry into a zone of operation where this crisis of boiling appears.

Up to the present, an attempt has always been made to operate under conditions providing a margin of safety between the conditions of operation of the reactor and the conditions in which the crisis of boiling would appear, in order to take into account the accuracy of the measurements and of the methods of evaluation of the conditions of appearance of the crisis of boiling.

On the other hand, a second type of phenomenon which can appear at the level of the fuel elements and lead to their destruction is the melting of one or more pellets of the fuel elements under the effect of too great a release of power which appears as a local rise in temperature to the melting point of the material forming the fuel pellets, this release of power being able to lead to melting when its value per unit length or linear power exceeds a certain threshold which may be determined as a function of the characteristics of the fuel.

To date, the techniques of protection of pressurized-water nuclear reactors against the appearance of one of these two phenomena have consisted in calculating parameters representative of these phenomena and triggering an emergency shutdown when one of the parameters exceeds a limiting value which has been assigned to it, this limiting value taking into account certain inaccuracies in the measurements, the more or less representative character of the parameter and the accuracy of evaluation of these parameters.

Hence one may be led to trigger emergency shutdowns in cases which are not really critical if the determination of the parameters is done with a certain inaccuracy.

The parameters representative of the crisis of boiling and the linear power may be determined by calculation, from a measurement of the inlet and outlet temperatures of the coolant in the reactor, of the pressure and flow of this coolant, and from the distribution of power in the core of the reactor.

In order to increase the accuracy of the determination, one may obviously increase the accuracy of the measurement of temperature pressure and flow, but to date the distribution of power in the core of the reactor could not be determined with accuracy during operation of the nuclear reactor, and one was satisfied to employ envelope values for this distribuiton, whether it was axial distribution or radial distribution of power.

In the methods commonly employed for handling pressurized-water nuclear reactors, the axial deviation of the flux is preferably maintained at a constant value.

The axial deviation of the flux is a parameter representative of the imbalance between the neutron flux from the upper portion of the core $\phi H$ and the neutron flux from the lower portion of the core $\phi B$. The parameter is equal to the ratio $$\frac{\phi H - \phi B}{\phi H + \phi B}.$$

Hence in this method of handling at constant axial deviation the only parameter measured as far as the distribution of flux or power in the core is concerned is the axial deviation of the flux.

However, for one and the same value of axial deviation, it is possible to conceive forms of distribution of the flux along the fuel element which are extremely variable.

In order to take into account this uncertainty about the distribution, for the calculation of the parameters relative to the crisis of boiling and the linear power, an extremely unfavorable distribution is employed, called the envelope distribution, which enables all of the most favorable cases of distribution to be included, which would lead to one and the same axial deviation of the flux.

As far as the radial distribution of the flux is concerned one takes into account an envelope factor of distribution which takes into account every possible situation and is a function of the position of the control rods.

Hence such envelope distributions lead to a relatively penalizing evaluation of the parameters which can lead to emergency shutdowns in less than critical cases.

On the other hand, in methods of controlling the reactor which are different from the constant axial deviation methods employed conventionally to date, such as the method described in applicants' French Patent Application No. 77-19316, which employs groups of control rods which are less absorbent than the groups employed in the case of handling at constant axial deviation, for example, and an absorbent regulation group, it is no longer possible to employ an envelope value which takes into account the positions of the control rods for the radial distribution, because this envelope value would have to take into account both the positions of the not very absorbent groups for power recovery and the position of the regulation group, which would be extremely complicated, or solely the position of the power recovery groups, which would lead to a very approximate evaluation of the parameters. In this way, one could not totally profit by the flexibility of use of the reactor available with this method of handling.

SUMMARY OF THE INVENTION

The object of the invention is therefore a method for protecting a pressurized-water nuclear reactor having fuel elements arranged in parallel with one another inside the core of the reactor delimiting coolant channels between them and between which control rods are moved by groups for the control of the reactor, which method enables avoidance of damaging said fuel elements by the appearance of the crisis of boiling and/or by the melting of one or more fuel pellets, this method permitting emergency shutdowns to be triggered in a more orderly fashion and the methods of handling of the reactor to be employed fully, to enable flexible control of the reactor as a function of the power demand.

With this aim, the method comprises the steps of:

(a) determining the level of power of the reactor from the measurements of inlet and outlet temperatures of the coolant in said reactor and of the pressure and flow of said coolant;

(b) determining the exact distribution of power in the axial direction of the core by measurements of neutron flux by ionization chambers arranged outside the reactor core, one of said chambers being above the other over the total height of said core;

(c) determining, from said level of power and the position of groups of control rods along the axial direction of the core a corrective factor or radial peaking factor, taking into account the distribution of power in the radial direction, at each point according to the position of said point in axial direction;

(d) determining the power release per unit length of said fuel elements, from said level of power, said radial peaking factor and said axial power, at each point in axial direction, and comparing said released power to a predetermined limit;

(e) determining, from said radial peaking factor and said axial power, the ratio of the maximum increase of enthalpy in said coolant channels to mean increase of enthalpy in the channels of said core, or enthalpy increase factor, and thus the maximum increase of enthalpy, corresponding to the hot channel of said core;

(f) determining from measured parameters of (a) from said maximum increase of enthalpy and predetermined correction terms taking into account the mixing of coolant between the hot channel and adjacent channels, the margin with respect to the crisis of boiling for a number of points in the axial direction of the core; and (g) triggering an emergency shutdown when at least one of the two parameters comprising (1) margin with respect to the crisis of boiling along said fuel elements, and (2) power released per unit length of said fuel elements, exceeds a predetermined limit.

By way of non-restrictive example an embodiment wll now be described of the method of protection in accordance with the invention, put into effect upon a pressurized-water nuclear reactor in which measurements are carried out of operational parameters which enable the calculation of the parameter representative of the crisis of boiling and of the power per unit length, the axial distribution of power and the radial distribution of power being determined by use of measurement chambers and to marking of the position of the control rods.

BRIEF DESCRIPTION OF THE DRAWINGS

FIG. 9 represents the corresponding development of the margin with respect to the trigger point of the protection against the crisis of boiling.

DETAILED DESCRIPTION

Figure 1:
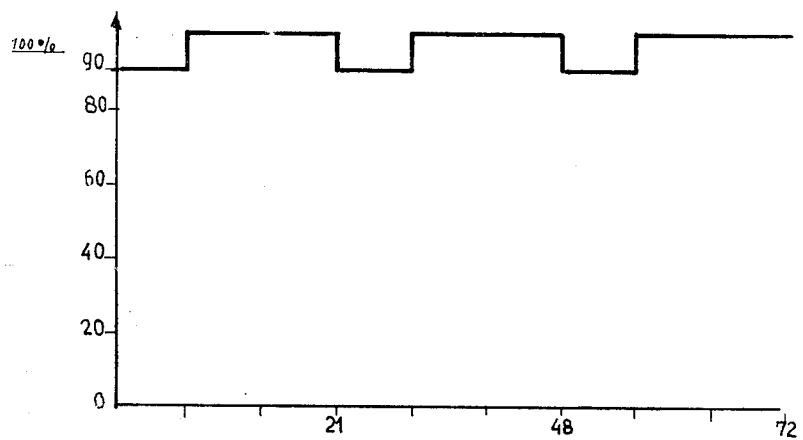
FIG. 1 represents as a function of time during a three-day operation of a pressurized-water nuclear reactor, the level the power of the reactor with respect to the nominal power in the case of a low plateau of this power equal to 90% of the nominal power.

The different methods of operation which will be described later have been carried out upon a pressurized-water nuclear reactor equipped with a device for measurement of neutron flux consisting of four sets of ionization chambers arranged axially one above the other and over a height corresponding to the total height of the core. Eaxch set comprises six chambers and the four sets are disposed outside the core vertically, in two perpendicular planes, equally spaced from the envelope of the core. Such a measuring set having ionization chambers has been described, for example, in French Patent No. 2,268,353, and includes six measuring chambers having two electrodes, one of which is covered with a deposit of boron.

Each of the six measuring chambers encloses an ionizable gas in contact with the electrodes held at different voltages.

During bombardment by the neutrons proceeding from the core of the reactor, of the deposit of boron carried by one of the electrodes, by reaction $(n,\alpha)$, $\alpha$ particles are produced which ionize the gas enclosed in the chamber, with the result that the created ions are driven towards the electrodes and collected, and the measurement of the current emitted at the level of these electrodes is representative of the measurement of the neutron flux emitted by the reactor at the level of the ionization chamber.

From the ionization currents measured at the level of each of the chambers, the neutron flux at the level of the deposit of boron produced in the measuring chamber can be determined.

In the case of the measuring device having ionization chambers which is employed within the scope of the invention, deposits of boron have been produced in each of the chambers over a length of 10 cm with a gap between each of the deposits of boron in each of the chambers of 60.7 cm, resulting in six measuring sections along the height of the core.

From measurements of the ionization currents in each of the six chambers the power emitted by each one-sixth part of the core in the axial direction can be derived by an original method.

The probability for a neutron emitted by a certain part of the core to be captured by a certain measuring chamber is supposed to be related to the distance between the emission and the detection point of the neutron, by a physical law. From these considerations, and using simplifications based on symmetry of the system, a matrix (6,6) can be derived and used to calculate the neutron flux and power of each of the six core sections from the ionization currents.

From these six values of power emitted by each of the six sections of the core, a new method of calculation enables an accurate representation to be obtained of the axial distribution of power along the fuel elements.

The power $P(z)$, z having the coordinate related to the axial position of the point where said power is developed, is assumed to be in the form of the polynome.

$$P(z) = \sum_{k=0}^{n} a_k z^k$$

In practice, n is chosen equal to 7.

If $P_j$ is the total power emitted by a section j of the core:

$$P_j = \int_{Z_j}^{Z_j + 1} P(z) \, dz = \int_{Z_j}^{Z_j + 1} \sum_{k=0}^{7} a_k z^k$$

Thus, the ak coefficients can be calculated from the value of $P_j$, so that the axial distribution is accurately determined. In practice, the core is divided into 30 equal sections in the axial direction and 30 values of $P(z)$ are calculated to represent the axial distribution of power.

Besides these measurements enabling a determination of the axial distribution of the power, an accurate measurement is carried out of the position of the groups of control rods as well as the measurement of the parameters enabling the level of power of the reactor to be determined.

The parameters which enable the level of power to be determined are the pressure of the primary fluid, the inlet temperature and the outlet temperature of this fluid in the reactor, and the flow of this fluid measured with reference to a nominal flow. From these parameters one determines in conventional fashion the level of power of the reactor which, added to knowledge of the position of the groups of control rods in the direction of the height of the core, enables the radial distributions of power to be determined according to the position of the groups of control rods in the direction of the height of the core. The radial distribution of power is represented by the values of a corrective factor called radial peaking factor FXY as a function of the axial coordinate z.

From the level of power of the reactor and the axial and radial distributions of power, the power per unit length along the fuel elements can be determined for each of the 30 axial zones defined along the height of the core. Each value of the power per unit length is compared to a limit determined as a function of the characteristics of the fuel.

In the case where one of the values of the power per unit length exceeds the limiting power, an emergency shutdown is triggered.

From the axial and radial distributions of power, the factor for the increase in enthalpy F$\Delta$h can be determined.

The enthalpy increase factor F$\Delta$H is equal to the ratio

F$\Delta$H = $\Delta$H max/$\Delta$H mean

Where $\Delta$H max is the maximum increase of enthalpy in a channel of the core, i.e., the increase of enthalpy in the hot channel of the core.

$\Delta$H mean is the mean increase of enthalpy in the channels of the core.

F$\Delta$H can be calculated from P(z) and F(xy) (z) in each of the 30 sections of the core by a calculation of the type:

$$F\Delta H = \frac{\sum_{i=1}^{i=30} Fxy(i) \, P(i)}{\sum_{i=1}^{i=30} P(i)}$$

One can deduce from F$\Delta$H and $\Delta$H mean determined from the level of power of the reactor and the flow of coolant, $\Delta$H max corresponding to the hot channel.

The margin with respect to the crisis of boiling or departure from nucleate boiling ratio DNBR represents the ratio between the critical thermal flow for avoiding nucleate boiling to the local thermal flow at a point of the core. In fact, calculations are made for the hot channel as the most likely to be in the conditions of nucleate boiling. But transverse flows of coolant are produced between the hot channel and the adjacent channels. So there is a mixing of coolant between these channels.

These phenomena are taken into account by predetermined correction terms in the calculation of DNBR. If the DNBR is inferior to a limit (generally 1.3), an emergency shutdown is triggered. The calculations being carried out as described, using the hot channel, the simplification obtained permits a total duration of calculation inferior to one second and the utilization of microprocessors in the place of a computer of great capacity.

Hence it may be seen that the method in accordance with the invention enables emergency shutdowns to be decided upon when certain parameters exceed an assigned value, these parameters being determined accurately by means of a determination of the distribution of power in the core without the employment of envelope distributions, so that a series of situations may be covered.

Hence, whatever the operative situation of the nuclear reactor, the power per unit length of the fuel elements can be determined as a function of the position in the core, and the maximum value of this parameter during any stage of operation of the reactor.

Figure 2:
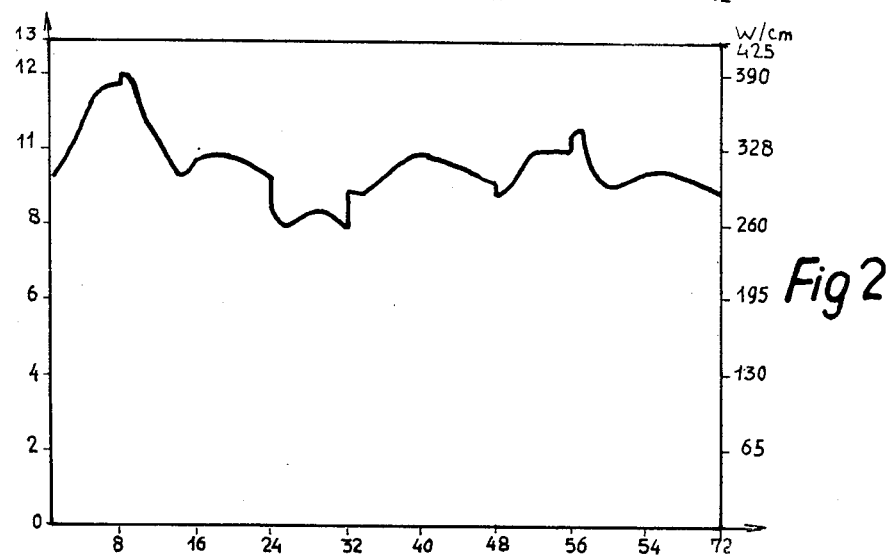
FIG. 2 represents the variations in the maximum value of the power per unit length along the fuel elements, for an operation corresponding with the graph of FIG. 1.

Thus, in the case of operation corresponding to FIG. 1, where the reactor is operating either at nominal power or at a power equal to 90% of nominal power, it has been possible to determine, whatever the phases of operation, the maximum power per unit length, the variations of which have been represented in FIG. 2.

Thus, it is seen that the operation of the nuclear reactor in accordance with the graph represented in FIG. 1 is possible without exceeding the limiting value assigned to the power per unit length and represented by a horizontal straight line, the ordinate of which is equal to this limit (425 W/cm).

Figure 3:
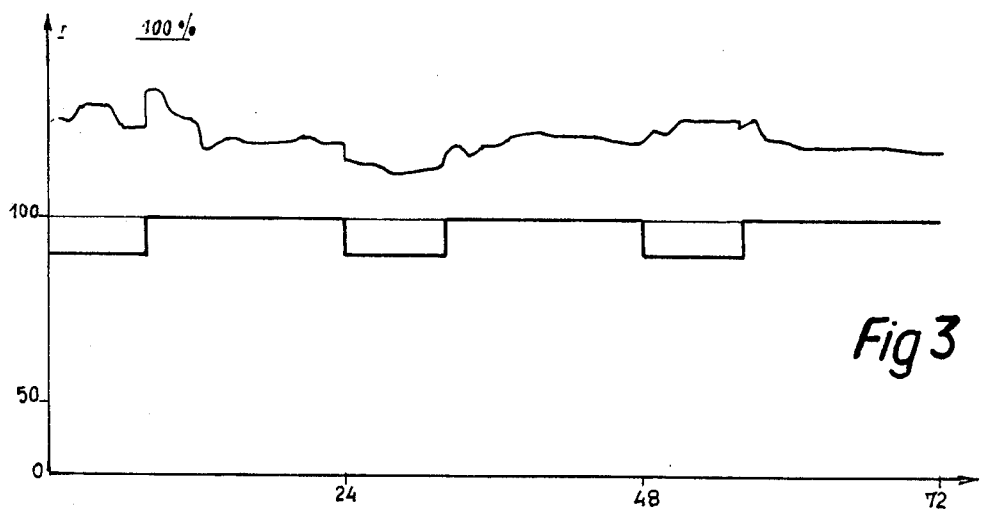
FIG. 3 represents the corresponding variations from the margin with respect to the trigger point of the protection against the crisis of boiling.

In FIG. 3 the variations are shown in the margin with respect to the point of triggering the protection against the crisis of boiling, during the course of operation of the reactor in accordance with the power program represented in FIG. 1. It may likewise be seen that the margin remains sufficient for the operation of the reactor to be continued for the three days corresponding to the power program.

Figure 4:
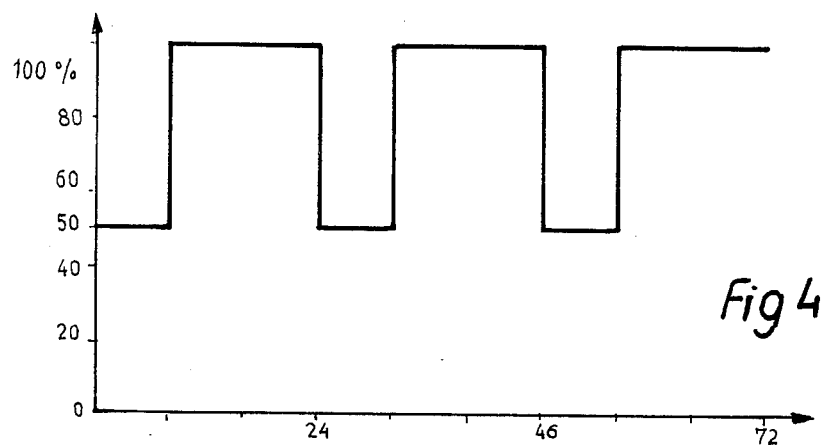
FIG. 4 represents the variations in the power measured with respect to the nominal power during the course of a three-day cycle of operation of the reactor with a low plateau at a value equal to 50% of the nominal power.

FIG. 4 represents a power program likewise of three days, during the course of which the nuclear reactor is employed either at its nominal power or at 50% of its nominal power, with an instantaneous return to this power between two phases of operation.

Figure 5:
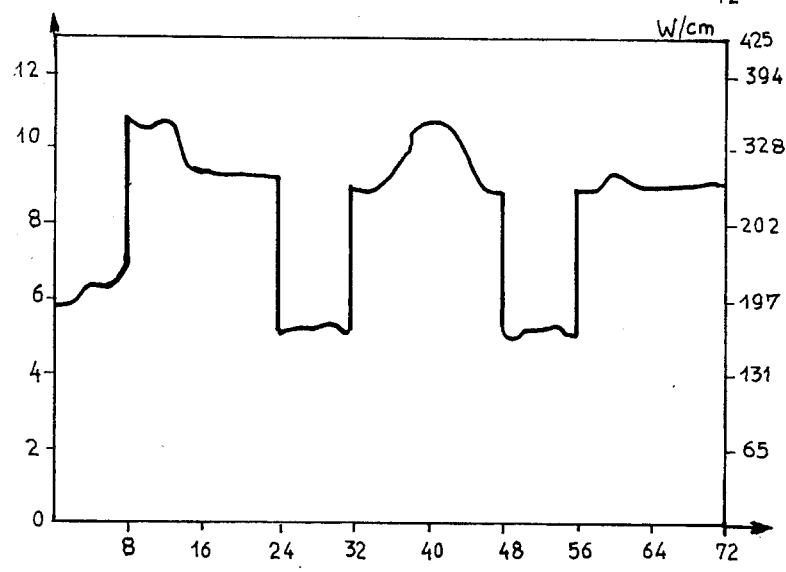
FIG. 5 represents the corresponding variations in the maximum power per unit length along the fuel elements.

FIG. 5 represents the corresponding variations of the maximum power per unit length, employing as the unit KW per foot and watts per centimeter.

It may be seen that operation is possible without reaching the limits beyond which an emergency shutdown is triggered.

Figure 6:
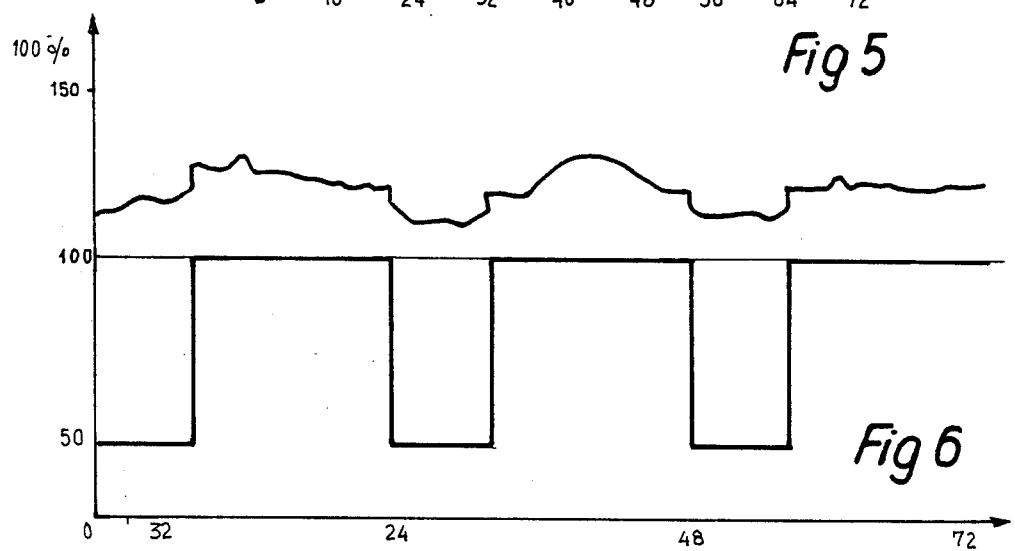
FIG. 6 represents the corresponding variations of the margin with respect to the trigger point of the protection with respect to the crisis of boiling.

FIG. 6 illustrates the corresponding variations in the margin with respect to the point of triggering the protection against the crisis of boiling, and it may be seen that operation is possible without reaching the lower limit of the margin of safety.

Figure 7:
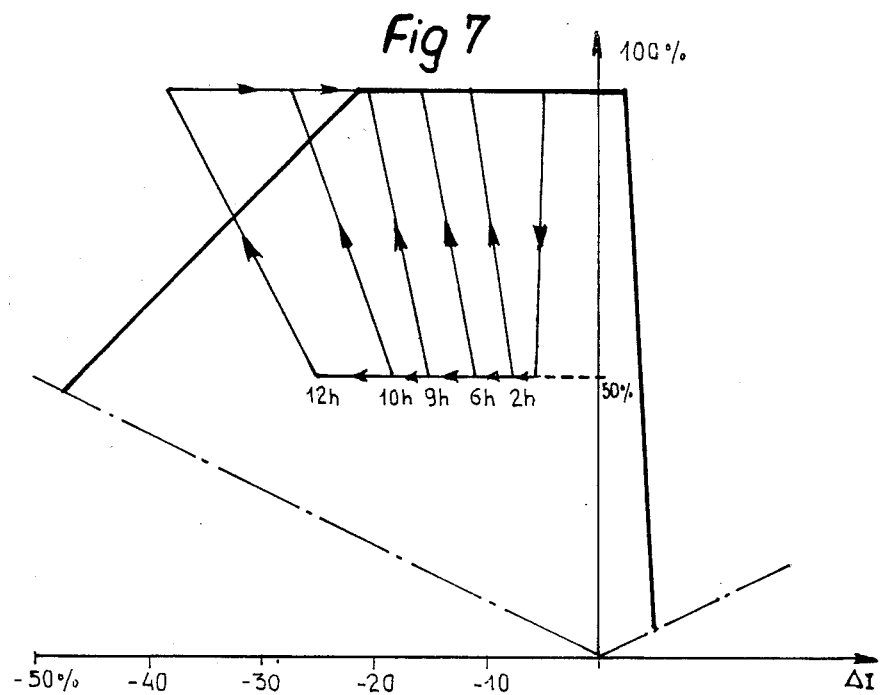
FIG. 7 represents, in the case of an operation of the nuclear reactor between the nominal power and a low plateau equal to 50% of the nominal power, the development of the axial deviation of flux during the course of an instantaneous return to nominal power after an operation of variable duration at 50% of the nominal power.

In FIG. 7, in a graph of the power demanded of the reactor with respect to the nominal power as a function of a parameter representative of the axial deviation, a method is represented of operation of the reactor between the nominal power and 50% of the nominal power, the maintenance of the reactor at 50% of the nominal power taking place during increasing periods of time of 2, 6, 9, 10 and 12 hours.

This graph shows in solid line the trapezium of operation inside which must remain the curves which are representative of the operation of the reactor in order to avoid triggering of an emergency shutdown, when a prior art method of protection of the reactor is employed.

It may be seen that, after maintenance for more than 9 hours at 50% of nominal power, it is no longer possible to carry out an instantaneous return of the reactor to its nominal power because one then leaves the operational trapezium. The prior art method therefore leads to an emergency shutdown by exceeding the operational limits.

Figure 8:
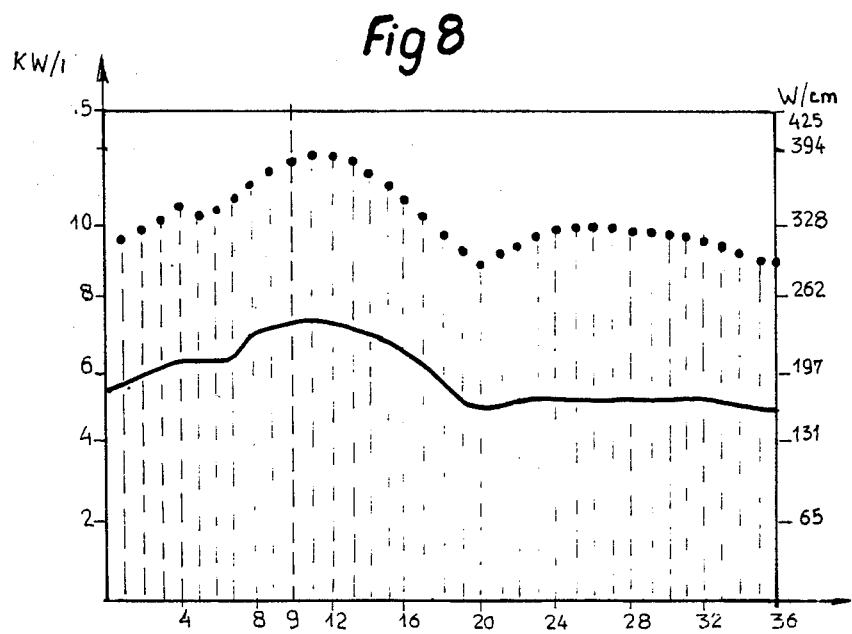
FIG. 8 represents the development of the maximum power per unit length along the fuel elements in an operation between the nominal power and a plateau at 50% of the nominal power, with an instantaneous return of power every hour.

The graph shown in FIG. 8 corresponds to the maximum power per unit length as a function of time for operation of the nuclear reactor between its nominal power and 50% of its nominal power, with instantaneous return to nominal power at any moment, instantaneous returns in the power being carried out every hour and giving rise to an increase in the power per unit length represented by the points arranged above the continuous curve representing the development of the linear power, in the case of holding at 50% of the nominal power.

It can be seen that the limiting value of the maximum power per unit length is never exceeded, whatever the time at which a return is made to nominal power.

Similarly, FIG. 9 shows the corresponding development of the margin with respect to the point of triggering the protection against the crisis of boiling in the case of a return to nominal power at any moment and it will be observed that this margin remains higher than the low, predetermined limit.

This last example, represented in FIGS. 7, 8 and 9, shows very well that the method in accordance with the invention confers increased flexibility in the exploitation of the nuclear reactor, due to a determination of the axial and radial distributions of power which enable a more exact calculation of parameters representative of the limits of utilization.

In the event of exceeding an operational limit relative to one of the parameters representative of the power released per unit length or of the crisis of boiling, an alarm is triggered which may lead, depending upon the exceeding of the other parameters and their value, either to an emergency shutdown or to blocking of the withdrawal of the clusters of control rods and to an automatic reduction in the load on the turbine.

The determinations of the different parameters and the triggering of the alarms are obtained by use of microprocessors which enable the processing of the different parameters measured in order to deduce from them the safety parameters which have been envisaged. The obtention of the results produces both alarms in the event that the limiting values are exceeded, and visualization of the development of the different parameters which enable surveillance of the development of the critical parameters related to protection of the reactor.

With the aim of facilitating the obtaining of the parameters, it has been seen that the calculation was carried out on a channel representative of the core of the nuclear reactor, called the hot channel. It would, however, be possible to calculate the parameters relative to the whole of the core by employing a computer of greater capacity if longer processing times are acceptable.

In short, the invention is not restricted to the embodiments which have been described but includes all their variants.

Thus, for the determination of the axial distribution of power from the measurement of the ionization chamber currents, it is possible to employ a development of polynomial form as described, which is quite satisfactory for obtaining an axial distribution repesentative of the real state of the core. It is equally possible to conceive of other forms of representation which enable a calculation of this distribution.

As concerns the calculation of the radial distribution of power from the position of the groups of the control rods, a method has been employed which consists in carrying out a sectioning of the core in the direction of its height (for example, 30 sections) with a determination of the presence or absence of each of the groups of control rods at the level of the section being considered, at the time of calculating the radial distribution factors Fxy(i). One can conceive of any other type of representation of the position of the control rods, provided that such position is measured with accuracy for each stage of operation of the reactor.

The invention is not restricted to the employment of microprocessors for the determination of each of the intermediate parameters and of each of the parameters representative of the operational limits. It is possible to conceive of the employment of computers of greater capacity in order to carry out more complicated determinations of parameters.

The alarms or emergency shutdowns triggered by the comparison of the parameters with their assigned limits may adopt any possible form and necessitate manual intervention or on the contrary trigger automatic actions upon the control elements of the nuclear reactor.

Finally, the method of protection in accordance with the invention may be applied to a pressurized-water nuclear reactor whatever its method of operation and whatever the power program demanded.

We claim:

1. A method for protecting a pressurized-water nuclear reactor having fuel elements arranged in parallel with one another inside the core of said reactor delimiting coolant channels between them and between which control rods are moved by groups for the control of the reactor, which method enables avoidance of damaging said fuel elements by the appearance of the crisis of boiling and/or by the melting of at least one fuel pellet, comprising the steps of (a) determining the level of power of the reactor from the measurements of inlet and outlet temperatures of the coolant in said reactor and of the pressure and flow of said coolant;

(b) determining the exact distribution of power in the axial direction of the core by measurements of neutron flux by ionization chambers arranged outside the reactor core, by measuring the ionization currents in each of said chambers;

(c) determining, from said level of power and the position of groups of control rods along the axial direction of the core a corrective factor or radial peaking factor, taking into account the distribution of power in the radial direction, at each point according to the position of said point in axial direction;

(d) determining the power released per unit length of said fuel elements, from said level of power, said radial peaking factor and said axial power at each point in axial direction, and comparing said power released to a predetermined limit;

(e) determining, from said radial peaking factor and said axial power, the ratio of the maximum increase of enthalpy in said coolant channels to the mean increase of enthalpy in the channels of said core, or enthalpy increase factor; and, thus, the maximum increase of enthalpy, corresponding to the hot channel of said core;

(f) determining from measured parameters of (a), from said maximum increase of enthalpy and predetermined correction terms, taking into account the mixing of coolant between the hot channel and adjacent channels, the margin with respect to the crisis of boiling for a number of points in the axial direction of the core; and (g) triggering an emergency shutdown when at least one of the two parameters comprising (1) margin with respect to the crisis of boiling along said fuel elements and (2) power released per unit length of said fuel elements, exceeds a predetermined limit; and, (h) said core being divided along its entire height into a plurality of superposed vertical sections, the total neutron flux in each of said sections being determined from the ionization currents measured in each of said chambers, the axial power being considered as a polynome with respect to the axial position of the point where said power is developed and said axial power being determined accurately by comparing the integrated values of neutron flux obtained from polynomial form of the axial power and the total neutron flux in each of said sections of said core derived from the ionization currents measurements.

2. A method according to claim 1, wherein six ionization currents are measured in six different ionization chambers, and six core sections of equal length are determined.

3. A method according to claim 2, wherein the determination of parameters and triggering of the alarms are effected by means of microprocessors.

* * * * *